A. WHEELER.
Potato Digger.

No. 40,786.  Patented Dec. 1, 1863.

Witnesses:
J. W. Coombs
G. W. Reed

Inventor:
Albin Wheeler
per Munn & Co.
Attorneys

UNITED STATES PATENT OFFICE.

ALBION WHEELER, OF MALLORY, IOWA.

IMPROVEMENT IN POTATO-DIGGERS.

Specification forming part of Letters Patent No. 40,786, dated December 1, 1863.

*To all whom it may concern:*

Be it known that I, ALBION WHEELER, of Mallory, in the county of Clayton and State of Iowa, have invented a new and Improved Potato-Digger; and I do hereby declare that the following is a full, clear, and exact description of the same, reference being had to the accompanying drawings, forming a part of this specification, in which—

Figure 1:
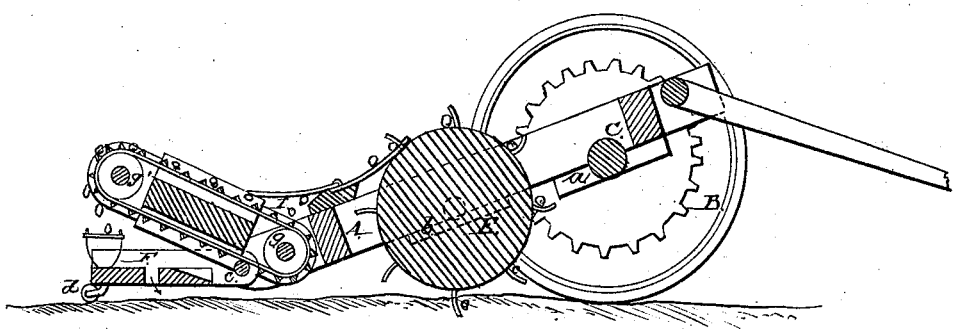
Figure 2:
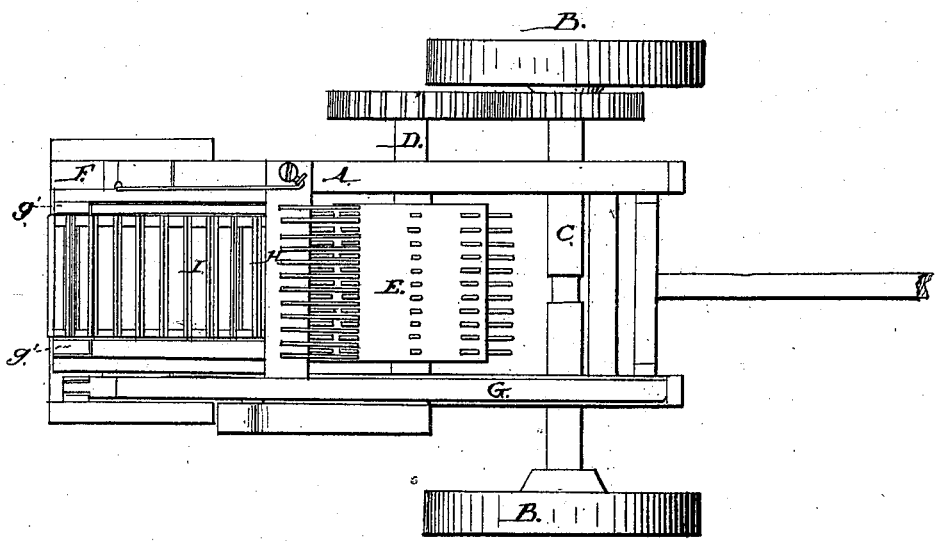

Figure 1 represents a longitudinal vertical section of my invention. Fig. 2 is a plan or top view of the same.

Similar letters of reference indicate corresponding parts in the two figures.

This invention consists in the arrangement of a hinged adjustable platform supported by a caster-wheel, in combination with a frame supported at the front end by two wheels, and carrying a rotary digging-cylinder, a conveyer, and a slatted endless apron, in such a manner that by said hinged platform the digging-cylinder can be thrown in and out of the ground, and that the potatoes dug up by said cylinder are thrown on the conveyer and delivered to the slatted apron, and by said apron carried up over the hinged platform and dumped, free from dirt and other impurities, into a basket or other receptacle on the rear end of the hinged platform.

To enable others skilled in the art to fully understand and construct my invention, I will proceed to describe it.

A represents a frame, made of wood or any other suitable material, and provided with suitable bearings or boxes, *a*, for the axle C of the driving-wheels B, and with bearings *b* for the axle D of the digging-cylinder E.

F is a platform, which is hinged to the rear end of the frame A by means of a pivot, *c*. The loose end of this platform is supported by a caster-wheel, *d*, and a hand-lever, G, serves to adjust its position. When it is brought in a horizontal position, as shown in Fig. 4 of the drawings, the teeth of the digging-cylinder cut into the ground; but when said platform is turned down in the direction of the arrow marked near it in Fig. 1 the rear end of the frame A is raised and the digging-cylinder is thrown out of the ground. The object of this arrangement is to enable the driver to raise the digging-cylinder from the ground when he wants to turn his machine at the ends of the field, or when he meets an obstruction, or whenever he does not want the digging-teeth to come in contact with the ground. When the cylinder is down the teeth take up the ground and the potatoes that may be contained in it and throw it on the conveyer H, which consists of a series of iron rods fitting between the teeth of the digging-cylinder, and placed at such distances apart that they retain the potatoes, but allow the dirt adhering to them to drop through.

From the conveyer H the potatoes and what dirt and other impurities may still be mixed with them drop down upon the endless slatted apron I, which is stretched over pulleys $g$ $g'$, which run on shafts that have their bearings in the rear end of the frame A. The pulleys $g'$ are elevated above the pulleys $g$, so that the apron extends in an upward inclined position over the hinged platform F. The slats of the apron I are placed at such distances apart that they retain the potatoes and permit the dirt and other impurities to pass through between them. By the time the potatoes have reached the highest part of the apron they are separated from all dirt and other impurities, and they are then dumped into a basket, barrel, or other receptacle that may be placed on the near end of the platform F, as indicated in red outline in Fig. 2.

This machine is very simple in its construction. It will act with little power and do its work perfect; and all its parts are so constructed that they are not liable to get out of order.

What I claim as new, and desire to secure by Letters Patent, is—

The arrangement of the hinged adjustable platform F, with caster-wheel *d*, in combination with the digging-cylinder E, conveyer H, and slatted apron I, all constructed and operating in the manner and for the purpose herein shown and described.

ALBION WHEELER.

Witnesses:
  J. W. POTTS,
  GEORGE HANCOCK.